US009921067B2

(12) United States Patent
Fanselow et al.

(10) Patent No.: US 9,921,067 B2
(45) Date of Patent: Mar. 20, 2018

(54) SYSTEMS AND METHODS FOR MATERIALS HANDLING VEHICLE ODOMETRY CALIBRATION

(71) Applicant: Crown Equipment Corporation, New Bremen, OH (US)

(72) Inventors: Timothy William Fanselow, Auckland (NZ); Justin Forbes Thode, Auckland (NZ); Ryan Michaels Estep, Christchurch (NZ)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 15/158,896

(22) Filed: May 19, 2016

(65) Prior Publication Data

US 2016/0349061 A1 Dec. 1, 2016

Related U.S. Application Data

(60) Provisional application No. 62/166,183, filed on May 26, 2015.

(51) Int. Cl.
*G01C 21/20* (2006.01)
*G01C 22/02* (2006.01)
(Continued)

(52) U.S. Cl.
CPC ........... *G01C 21/206* (2013.01); *G01C 22/02* (2013.01); *G01C 25/00* (2013.01); *G05D 1/021* (2013.01)

(58) Field of Classification Search
CPC ....... G01C 21/206; G01C 22/02; G01C 25/00
See application file for complete search history.

(56) References Cited

U.S. PATENT DOCUMENTS 4,939,659 A 7/1990 Moran et al.
5,020,008 A 5/1991 Chambers et al.
(Continued)

FOREIGN PATENT DOCUMENTS

WO 2014010174 A1 1/2014

OTHER PUBLICATIONS

Anonymous, "Odometer calibration", Research Disclosure 364047, Aug. 1994, pp. 1-2.*

(Continued)

*Primary Examiner* — Todd Melton
(74) *Attorney, Agent, or Firm* — Dinsmore & Shohl LLP

(57) ABSTRACT

Systems and methods for calibrating odometry of a materials handling vehicle. One embodiment of a method includes determining a current location of the materials handling vehicle, determining an odometry distance from the current location to a destination based on a calculation of a determined number of rotations of a wheel and a circumference of the wheel, and determining a positioning system distance from the current location to the destination. Some embodiments include comparing the odometry distance with data from the positioning system distance to calculate a scaling factor, applying the scaling factor to a fast alpha filter to achieve a fast filter result, and applying the scaling factor to a slow alpha filter to achieve a slow filter result. Similarly, some embodiments include applying the fast alpha filter to the scaling factor to smooth noise, calculating an updated odometry distance utilizing the scaling factor, and utilizing the updated odometry distance.

20 Claims, 6 Drawing Sheets

(51) Int. Cl.
*G05D 1/02* (2006.01)
*G01C 25/00* (2006.01)

(56) References Cited

U.S. PATENT DOCUMENTS

| | | | |
|---|---|---|---|
| 5,155,684 A * | 10/1992 | Burke | G05D 1/0246 |
| | | | 318/587 |
| 5,686,925 A * | 11/1997 | Maeda | G01S 19/52 |
| | | | 342/104 |
| 5,884,207 A * | 3/1999 | Burkhard | B60T 8/17616 |
| | | | 180/197 |
| 7,405,834 B1 | 7/2008 | Marron et al. | |
| 8,339,282 B2 | 12/2012 | Noble et al. | |
| 8,548,671 B2 * | 10/2013 | Wong | G01C 25/00 |
| | | | 701/29.1 |
| 9,170,581 B2 | 10/2015 | Bell et al. | |
| 9,349,181 B2 | 5/2016 | Chandrasekar et al. | |
| 9,354,070 B2 | 5/2016 | Thomson et al. | |
| 2005/0029347 A1 | 2/2005 | Noble et al. | |
| 2011/0057816 A1 | 3/2011 | Noble et al. | |
| 2012/0323432 A1 | 12/2012 | Wong et al. | |
| 2013/0069765 A1 | 3/2013 | Noble et al. | |
| 2014/0204083 A1 | 7/2014 | Thomson | |
| 2015/0094900 A1 | 4/2015 | Bell et al. | |
| 2015/0120125 A1 | 4/2015 | Thomson et al. | |
| 2015/0146988 A1 | 5/2015 | Oami | |
| 2015/0379704 A1 | 12/2015 | Chandrasekar et al. | |
| 2015/0379715 A1 | 12/2015 | Chandrasekar et al. | |
| 2016/0011595 A1 | 1/2016 | Bell et al. | |
| 2016/0169278 A1 | 6/2016 | Campbell et al. | |

OTHER PUBLICATIONS

International Search Report and Written Opinion dated Aug. 5, 2016 pertaining to International Application No. PCT/US2016/033191.

* cited by examiner

SYSTEMS AND METHODS FOR MATERIALS HANDLING VEHICLE ODOMETRY CALIBRATION

CROSS REFERENCE

This application claims the benefit of U.S. Provisional Patent Application Ser. No. 62/166,183 filed May 26, 2015, and entitled Adaptive Odometry Calibration.

TECHNICAL FIELD

Embodiments described herein generally relate to materials handling vehicle calibration and, more specifically, to odometry calibration and camera calibration of a materials handling vehicle, such as a forklift.

BACKGROUND

Materials handling vehicles, such as forklifts, may suffer from odometry degradation due to the wear of its driven or non-driven wheels. As the wheels incur wear, the tread degrades and the circumference of the wheel reduces. As a result, the accuracy of odometer determinations may degrade because the odometer may be calibrated for a predetermined size of wheel. Similarly, when a wheel, or a portion thereof is changed, the odometry determinations may change drastically for similar reasons.

Similarly, materials handling vehicles such as forklifts that determine location and routing of the materials handling vehicle via the identification of overhead lights are utilized in many environments. While these vehicles may be very reliable, the location and/or routing accuracy may be not be calibrated upon installation or may degrade through extended use of the materials handling vehicle. As such, the inefficiencies and errors may be created if the image capture device is not calibrated. As such, a need exists in the industry.

SUMMARY

Systems and methods for calibrating odometry of a materials handling vehicle. One embodiment of a method includes determining a current location of the materials handling vehicle, determining an odometry distance from the current location to a destination based on a calculation of a determined number of rotations of a wheel and a circumference of the wheel, and determining a positioning system distance from the current location to the destination. Some embodiments include comparing the odometry distance with data from the positioning system distance to calculate a scaling factor, applying the scaling factor to a fast alpha filter to achieve a fast filter result, and applying the scaling factor to a slow alpha filter to achieve a slow filter result. Similarly, some embodiments include applying the fast alpha filter to the scaling factor to smooth noise, calculating an updated odometry distance utilizing the scaling factor, and utilizing the updated odometry distance.

In another embodiment, a materials handling vehicle includes materials handling hardware, a wheel, an odometer, a positioning system, and a vehicle computing device. The vehicle computing device stores logic that when executed by a processor, causes the materials handling vehicle to determine a current location of the materials handling vehicle within a warehouse, determine, via the odometer, an odometry distance from the current location to a destination based on a calculation of a determined number of rotations of the wheel and a circumference of the wheel, and determine, via the positioning system, a positioning system distance from the current location of the materials handling vehicle to the destination. In some embodiments the logic may cause the materials handling vehicle to compare the odometry distance with the positioning system distance to calculate a scaling factor, apply the scaling factor to a slow alpha filter to achieve a slow filter result, the slow alpha filter representing a slow change to the odometry distance, based on wear of the wheel, and apply the scaling factor to a fast alpha filter to achieve a fast filter result, the fast alpha filter representing a fast change to the odometry distance, based on changing of the wheel. In some embodiments, the logic causes the materials handling vehicle to compare the slow filter result with the fast filter result. In response to determining that a difference between the slow filter result and the fast filter result is within a predetermined tolerance, the slow filter result may be applied to the scaling factor to smooth noise. In response to determining that a difference between the slow filter result and the fast filter result is not within the predetermined tolerance, the fast filter result may be applied to the scaling factor to smooth noise. Some embodiments of the logic may cause the materials handling vehicle to calculate an updated odometry distance utilizing the scaling factor and utilize the updated odometry distance to operate the positioning system.

In yet another embodiment, a materials handling vehicle includes materials handling vehicle comprising a wheel and a vehicle computing device. The vehicle computing device may store logic that when executed by a processor, causes the materials handling vehicle to determine a current location of the materials handling vehicle, determine an odometry distance from the current location to a destination based on a calculation of a determined number of rotations of the wheel and a circumference of the wheel, and determine a positioning system distance from the current location to the destination. In some embodiments, the logic causes the materials handling vehicle to compare the odometry distance with the positioning system distance to calculate a scaling factor, apply the scaling factor to a slow alpha filter to achieve a slow filter result, and apply the scaling factor to a fast alpha filter to achieve a fast filter result. In some embodiments, the logic causes the materials handling vehicle to, in response to determining that the slow filter result is within a predetermined tolerance of the fast filter result, apply the slow alpha filter to the scaling factor to smooth noise, calculate an updated odometry distance utilizing the scaling factor, and utilize the updated odometry distance to operate a positioning system.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for materials handling vehicle calibration. Some embodiments are configured for odometry calibration, while some embodiments are related to vehicle image capture device calibration.

Specifically, embodiments described herein may be configured to determine whether a vehicle odometer is calibrated and, if not, may calibrate the odometer to within a predetermined tolerance. Odometry calibration includes steer angle bias and scaling factor. Embodiments of steer angle bias calibration may be configured to cause the vehicle to report straight line driving when the materials handling vehicle physically travels in a straight line. Embodiments of scaling factor calibration may be configured to cause the materials handling vehicle to report the correct distance traveled. The scaling factor can be manually measured with reasonable success, but may change over time due to wheel wear and wheel or tire replacement. The present disclosure provides a system and method for adjusting the scaling factor during normal operation. Embodiments may be configured to measure the actual scaling factor and smoothly make changes thereto.

Image capture device calibration may be useful for materials handling vehicles that utilize overhead light detection for location determination of the materials handling vehicle and/or routing. Image capture device calibration may include intrinsic calibration and extrinsic calibration. Intrinsic calibration includes determining the parameters of the image capture device model itself within a suitable range of error. Extrinsic image capture device calibration may include determining the position of the image capture device on the materials handling vehicle within a suitable range of error. Embodiments described herein focus on extrinsic calibration of the image capture device. The systems and methods for vehicle calibration incorporating the same will be described in more detail, below.

Figure 1:
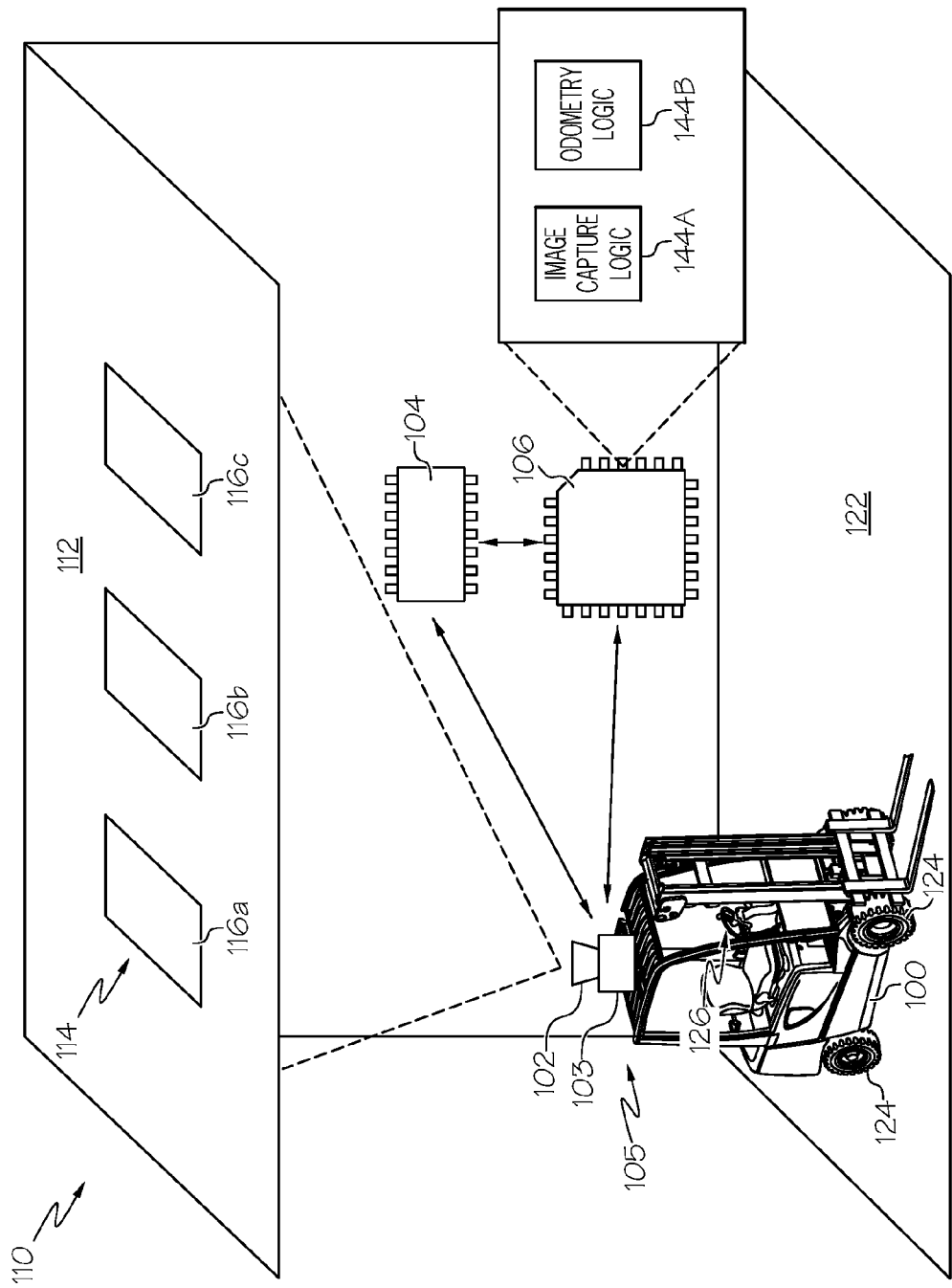
FIG. 1 depicts a materials handling vehicle that utilizes overhead lighting for location and navigation services, according to embodiments described herein.

Referring now to the drawings, FIG. 1 depicts a materials handling vehicle 100 that comprises materials handling hardware 105 and utilizes overhead lighting for location and navigation services, according to embodiments described herein. As illustrated, a materials handling vehicle 100 may be configured to navigate through an environment 110, such as a warehouse. The materials handling vehicle 100 may be configured as an industrial vehicle for lifting and moving a payload such as, for example, a forklift truck, a reach truck, a turret truck, a walkie stacker truck, a tow tractor, a pallet truck, a high/low, a stacker-truck, trailer loader, a sideloader, a fork hoist, or the like. The materials handling vehicle 100 may be configured to automatically and/or manually navigate a floor 122 of the environment 110 along a desired route. Accordingly, the materials handling vehicle 100 can be directed forwards and backwards by rotation of one or more wheels 124. Additionally, the materials handling vehicle 100 may change direction by steering the one or more wheels 124. The materials handling vehicle 100 may also include operator controls 126 for controlling functions of the materials handling vehicle 100 such as, but not limited to, the speed of the wheels 124, the orientation of the wheels 124, etc.

The operator controls 126 may include inputs and outputs that are assigned to functions of the materials handling vehicle 100 such as, for example, switches, buttons, levers, handles, pedals, calibration indicators, etc. The operator controls 126 may additionally include an odometer for determining a distance that the materials handling vehicle 100 travels, a user interface for providing output (such as audio and/or visual output) and receiving data and/or input from the user. The odometer may be configured to determine a determined number of rotations of one or more of the wheels 124 and calculate a distance traveled, based on a predetermined circumference of the wheels 124. The operator controls 126 may additionally include a positioning system, localization system, an accelerator, a brake, an autonomous mode option, and/or other controls, outputs, hardware, and software for operating the materials handling vehicle 100 manually, semi-autonomously, and/or fully-autonomously.

The materials handling vehicle 100 may also include an image capture device 102 such as a digital still camera, a digital video camera, an analog still camera, an analog video camera, and/or other device for capturing an overhead image. The captured image may be formatted as a JPEG, JPEG 2000, Exif, TIFF, raw image formats, GIF, BMP, PNG, Netpbm format, WEBP, raster formats, vector formats, and/or other type of format. Accordingly, the image capture device 102 may include an image sensor such as, for example, a charge coupled device (CCD), complementary metal-oxide-semiconductor sensor, or functional equivalents thereof. In some embodiments, the materials handling vehicle 100 can be located within the environment 110 and be configured to capture overhead images of the ceiling 112 of the environment 110. In order to capture overhead images, the image capture device 102 can be mounted to the materials handling vehicle 100 and focused to the ceiling 112.

The ceiling 112 of the environment 110 may include overhead lights such as, but not limited to, ceiling lights 114 for providing illumination from the ceiling 112 or generally from above a materials handling vehicle 100 operating in the warehouse. The ceiling lights 114 may include substantially rectangular lights such as, for example, skylights 116a, fluorescent lights 116b, and/or other types of lights 116c; and may be mounted in or suspended from the ceiling 112 or wall structures so as to provide illumination from above. It should be understood that although FIG. 1 depicts rectangular shaped lights, the ceiling lights 114 may be of any shape, size, or type. For example, the ceiling lights 114 may be round, arcuate, a hanging LED strip light, domed skylight, and the like and the type of ceiling light 114 may be high bay lights, track lighting, string lights, strip lighting, diffused lighting and the like.

Additionally, the materials handling vehicle 100 may include and/or be coupled with a vehicle computing device 103. The vehicle computing device 103 may include a processor 104 (which may be implemented as one or more processors) communicatively coupled to the image capture device 102. The processor 104 may be configured to execute logic to implement any of the methods or functions described herein automatically. A memory component 106 may also be included and may be utilized for storing logic, including machine-readable instructions can be communicatively coupled to the processor 104, the image capture device 102, or any combination thereof.

The processor 104 may include an integrated circuit, a microchip, and/or other device capable of executing machine-readable instructions or that has been configured to execute functions in a manner analogous to machine readable instructions. The memory component 106 may include RAM, ROM, a flash memory, a hard drive, or any non-transitory device capable of storing logic, such as machine readable instructions. As such, the memory component 106 may store image capture logic 144a and odometry logic 144b for providing the instructions and facilitating the functionality described herein.

For example, the odometry logic 144b may cause the materials handling vehicle 100 to navigate along the floor 122 of the environment 110 on a desired route to a destination. In some embodiments, the image capture logic 144a may cause the materials handling vehicle 100 to determine the localized position of the materials handling vehicle 100 with respect to the environment 110 via a captured image of the ceiling lights 114. The determination of the localized position of the materials handling vehicle 100 may be performed by comparing the image data to site map data of the environment 110. The site map may represent imagery of the ceiling and associated location coordinates and can be stored locally in the memory component 106 and/or provided by a remote computing device. Given the localized position and the destination, a route can be determined for the materials handling vehicle 100. Once the route is determined, the materials handling vehicle 100 can travel along the route to navigate the floor 122 of the environment 110.

In operation, the materials handling vehicle 100 may determine its current location via a user input, a determination via the vehicle computing device 103 (such as the materials handling vehicle 100 crossing a radio frequency identifier, via a positioning system, etc.), and/or a determination via the remote computing device. Some embodiments may be configured to utilize the image capture device 102 to capture an image of the ceiling 112, which may include the one or more ceiling lights 114. In some embodiments, the one or more ceiling lights 114 may include and/or be configured to provide a unique identifier to the vehicle computing device 103. Similarity, some embodiments are configured such that the image that the image capture device 102 captures may otherwise be compared to the site map to determine the current vehicle location.

Once the current location of the materials handling vehicle 100 is determined, the materials handling vehicle 100 may traverse a route to a destination. Along the route, the image capture device 102 may capture image data of the ceiling 112 and the ceiling lights 114. Depending on the embodiment, the image data may include a location identifier, such as a landmark, signal from the light fixture, etc. As images of the ceiling lights 114 are captured, the vehicle computing device 103 may compare the image of the ceiling 112 and/or the ceiling lights 114 with the site map. Based on the comparison, the vehicle computing device 103 may determine a current position of the materials handling vehicle 100 along the route.

While the infrastructure described above may be utilized for determining a location of the materials handling vehicle 100. Oftentimes, the odometer may become inaccurate because the wheels 124, which typically include inflatable or non-inflatable tires, become worn and the circumference changes. Additionally, the odometer may become inaccurate when a worn wheel, or merely the worn tire portion of the wheel, is replaced, which immediately changes the effective circumference of the wheel 124. It is noted that the term "wheel" refers to the wheels of the materials handling vehicle 100 that support the materials handling vehicle 100 and enable its transitory movement across a surface.

Similarly, while the image capture device 102 may be configured to capture imagery that is utilized for determining a location of the materials handling vehicle 100, the image capture device 102 may need to be initially calibrated to perform this function. Specifically, despite the depiction in FIG. 1, the image capture device 102 may be angled, tilted, and/or rotated relative to the ceiling 112. Additionally, usage of the materials handling vehicle 100 and/or image capture device 102 may cause the image capture device 102 to lose calibration, thus requiring recalibration.

Figure 2:
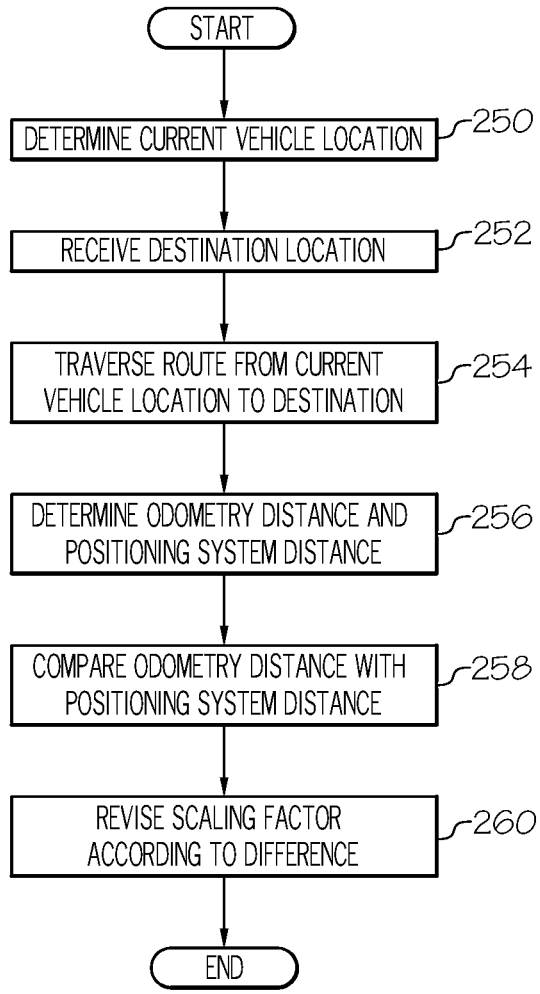
FIG. 2 depicts a flowchart for calibrating odometry of a materials handling vehicle, according to embodiments described herein.

FIG. 2 depicts a flowchart for calibrating odometry of a materials handling vehicle 100, according to embodiments described herein. As illustrated in block 250, a current location of the materials handling vehicle 100 may be determined. As discussed above, this vehicle location may be determined from a positioning system and/or localization system on the materials handling vehicle 100, via user input, and/or via other similar mechanism. Regardless, in block 252, a destination location may be determined. The destination location may be determined from a remote computing device (such as to provide an instruction to complete a job), via a user input, via a determination of past actions, and/or via other mechanisms. It should also be understood that a destination need not be final destination of the materials handling vehicle 100. In some embodiments, the destination may merely be a point along the route.

In block 254, the materials handling vehicle 100 may traverse the route from the current vehicle location to the destination. As described above, the materials handling vehicle 100 may traverse the route via a manually operated mode, a semi-autonomous mode, and/or via a fully autonomous mode. In block 256, an odometry distance may be determined and the positioning system distance may be determined. As discussed above, the odometry distance may be determined by the odometer. The positioning system distance may be determined from the positioning system and/or from the capture of image data, as described above. In block 258, the odometry distance may be compared with the positioning system distance, which may include the determination of a scaling factor. The actual scaling factor can be measured by comparing the raw accumulated odometry distance to the actual change in vehicle position. The accumulated odometry distance is the total distance traveled between the start and end of travel according to odometry (without using a scaling factor). The actual distance traveled is the straight line distance between the positions (x, y) at the start and the end of travel, as determined by the positioning system.

$$f_{scaling} = \frac{\sqrt{(x_{end} - x_{start})^2 + (y_{end} - y_{start})^2}}{\sum_{start}^{end} \Delta \text{distance}_{odometry}}$$

In block 260, the scaling factor may be revised according to the difference. Once the scaling factor is revised, the odometry calculation will be more accurate, as the calculation of distance will include the revised scaling factor. Accordingly, an updated odometry distance may be determined utilizing the revised scaling factor. As an example, if the odometer counts the number of rotations and multiplies that number by the predetermined circumference of the wheels, the scaling factor may be multiplied by that product to determine the actual odometry distance traveled.

Figure 3:
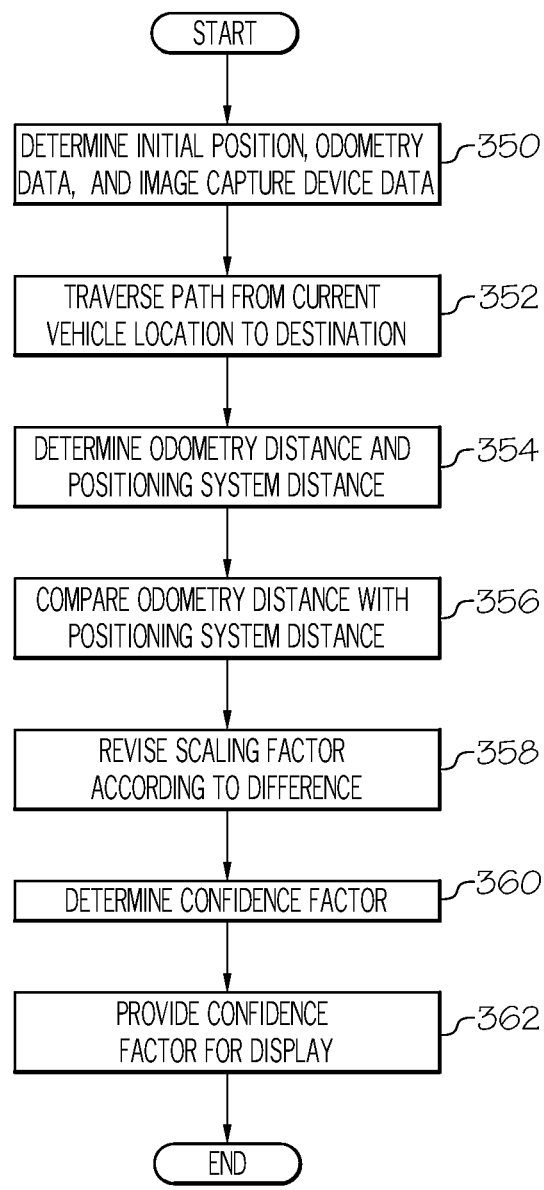
FIG. 3 depicts a flowchart for revising a scaling factor in odometry calibration, according to embodiments described herein.

FIG. 3 depicts a flowchart for revising a scaling factor in odometry calibration, according to embodiments described herein. As illustrated in block 350, an initial position, an odometry, and image data may be determined. As described above, the initial position may be determined from a user input, data from the image capture device 102, and/or data from a positioning system. The odometry data may be determined from the odometer, from the remote computing device, and/or from user input. The image capture device 102 may be configured for capturing image data and may send the captured image data to the vehicle computing device 103. In block 352, the materials handling vehicle 100 may traverse the route from the current vehicle location to the destination.

In block 354, an odometry distance and a positioning system distance may be determined. As described above, the odometer may provide odometry data to the vehicle computing device 103. Additionally, the distance that the materials handling vehicle 100 has traveled may be determined by the positioning system and/or from the image data received from the image capture device 102. A positioning system may include a global positioning system, the image capture device 102, the remote computing device, and/or other hardware and software for determining the position of the materials handling vehicle 100. In block 356, the odometry distance (utilizing the scaling factor) may be compared with the positioning system distance (and/or the site map). This comparison may be made to determine whether the calibration of the scaling factor is current. If the difference between the odometry distance and the positioning system distance exceeds a predetermined threshold, the scaling factor may be adjusted.

Specifically, embodiments may be configured such that the scaling factor is updated to substantially match the most recent measurements, while smoothing out noise and responding quickly to a tire change or wheel change. Generally, the scaling factor will slowly change over time to accommodate wheel wear. This will be punctuated by wheel changes, where the scaling factor will increase suddenly. To facilitate gradual wear of the wheels and the rapid change experienced from a wheel or tire replacement, embodiments may utilize a plurality of alpha filters, which may be embodied as exponential moving average filters as part of the odometry logic 144b. A first alpha filter responds relatively quickly and is referred to herein as the fast filter. A second alpha filter responds relatively slowly and is referred to herein as the slow filter.

While the two filters are in agreement (within a predetermined tolerance), the scaling factor may be set to substantially equal a value from the slow filter output. This ensures errors in scaling factor measurements are smoothed out. When the two filters disagree, the scaling factor is set to equal a value from the fast filter value output. This allows the scaling factor to quickly respond to a wheel change. Embodiments may be configured to update the in-use scaling factor every time a successful result is obtained. A degree of hysteresis can be added to prevent rapid switching between the filters.

The filters may be configured to operate as follows: $FV_1 = FV_0(\alpha) + MV(1-\alpha)$ where $FV_1$ is the new filter value, $FV_0$ is the prior filter value, MV is the measured value, and $\alpha$ is the alpha value of the filter. In one embodiment, the following alpha values are implemented in the calibration routine of the present disclosure: $\alpha = 0.99$ (referred to as the first alpha filter value and/or slow alpha filter value); and $\alpha = 0.9$ (referred to herein as the second alpha filter value and/or the fast alpha filter value). These filters may thus provide a slow filter result for the slow alpha filter and a fast filter result for the fast alpha filter.

As is noted above, when the two filters are in agreement, within a tolerance, the scaling factor is set to equal the slow filter output. In one contemplated embodiment, this tolerance is equal to about 0.075. To prevent rapid switching between the filters, some embodiments are configured with a hysteresis value of about 0.0025 can be implemented. In such an embodiment, the filter difference must be lower than the hysteresis value before switching back to the slow filter.

In some embodiments, the aforementioned alpha, tolerance, and/or hysteresis values can be determined by logging a raw scaling factor measurement (or a plurality of raw scaling factor measurements) across at least one materials handling vehicle 100 in a fleet of materials handling vehicles, including at least one wheel change at some point in the logged data. Given this raw data, the combined filter signal can be run on the raw data and the parameters can be adjusted as necessary to obtain a reasonable result across all logs.

It is contemplated that embodiments described herein may be implemented to detect when a wheel has been changed on a materials handling vehicle 100. When a wheel has been changed, a rapid increase in scaling factor contrasts strongly to the usual, gradual decrease in scaling factor under normal wear. For example, the slow alpha filter may be used to account for wheel 124 wear during operation of the materials handling vehicle 100. When a new wheel 124 is mounted on the materials handling vehicle 100, the scaling factor may rapidly increase to exceed the tolerance value resulting in the fast alpha filter being used to determine the scaling factor. The fast alpha filter is used until the filter difference is below the hysteresis value at which time, the slow alpha filter is then used to determine the scaling factor. In other words, the fast alpha filter is used when a wheel 124 is changed to rapidly adjust the scaling factor until the scaling factor accounts for the new wheel 124 circumference. At which time, the slow alpha filter is used to account for tire wear of the new wheel 124. Embodiments may also be configured to utilize scaling factor data to determine that a change in wheels 124 is needed, for the application of preventative maintenance.

Referring again to FIG. 3, in block 358 the scaling factor may be revised according to the difference. In block 360, a confidence factor may be determined. Specifically, the scaling factor may be set to a value to accommodate to changes in the materials handling vehicle 100. Additionally, a determination may be made regarding whether that scaling factor is set to accurately provide odometry data for the materials handling vehicle 100. In block 362, the confidence factor associated with the calibration confidence may be provided for display. Once the calibration is complete, the updated odometry distance may be utilized to operate the positioning system.

Some embodiments may be configured to store position fixes at the beginning and end of the measured movement. For example, where overhead lights are used in navigation, some embodiments ensure that at least two lights are visible and the light confidence in reading the two lights is relatively high when determining the vehicle position. Similarly, some embodiments may also ensure that the vehicle computing device 103 maintains position fixes for the duration of the measured movement. This can help ensure that the vehicle computing device 103 does not become aliased, which could provide an erroneous measurement of the actual distance traveled. Some embodiments are configured to ensure that the total distance traveled exceeds a predetermined threshold. For example, when the measured distance is accurate to within ±0.1 meters, and an odometry accuracy of 1% is required, then a travel distance of at least (0.1+0.1)/1%=20 meters may be required.

Embodiments described herein may also be configured for calibration of the image capture device 102. As discussed above, when a materials handling vehicle 100 is equipped with an image capture device 102, the image capture device 102 may be angled, turned, and/or rotated. As a consequence, the image capture device 102 may be calibrated prior to use. Similarly, use of the materials handling vehicle 100 may cause the image capture device 102 to lose calibration. As a result, updates to the calibration may be provided.

Accordingly, the materials handling vehicle 100 may be positioned at a location with known coordinates. The coordinates may be determined by the user entering the coordinates, the materials handling vehicle 100 passing a radio frequency identifier with a known location, and/or via other mechanisms. Additionally, a seed value may be provided to the vehicle computing device 103 (and/or the remote computing device) for the image capture device 102. The seed value may include one or more numbers that represents the position (e.g., pitch, roll, yaw) of the image capture device 102, and/or other values related to the external calibration. The seed value may be provided by a manufacturer of the image capture device 102, estimated at installation, preprogrammed into the vehicle computing device 103, and/or provided via other mechanisms.

Regardless, the materials handling vehicle 100 may then navigate according to a predetermined route through the environment 110. As the materials handling vehicle 100 proceeds through the environment 110, the image capture device 102 may capture images of the ceiling 112. The vehicle computing device 103 may compare the captured images with a site map to determine a location that the materials handling vehicle 100 was located when capturing that image. A calibration confidence may then be determined regarding the current calibration of the image capture device 102. Data related to the calibration confidence may be provided to the user, such as via a visual indication, such as via user interface on the materials handling vehicle 100. The calibration confidence may be determined via a comparison of an expected image via a captured image at a plurality of positions along the route. Specifically, after a calibrated value is determined, the process of capturing images and comparing the images with the site map may continue. As the accuracy of the captured images increases, so too does the calibration confidence. If the calibration confidence meets a predetermined threshold, the materials handling vehicle 100 may be deemed to already be calibrated. However, if the calibration confidence does not meet the threshold, calibration may be desired.

Referring specifically to embodiments that utilize ceiling light observations for localization and navigation, the vehicle computing device 103 may be configured to construct and maintain an estimate of the vehicle trajectory, while keeping a record of previous observations of the ceiling 112 and/or ceiling lights 114. The vehicle computing device 103 may additionally maintain an estimate of the calibration of the image capture device 102. Given the joint estimate of the calibration of the image capture device 102, the path of the materials handling vehicle 100, and the observations of ceiling lights 114 along that path, the vehicle computing device 103 can compute a statistical error value representing an accuracy between the set of observations and the site map. In turn, this error function can be used as feedback in an error-minimizing optimizer. In this way, the estimated trajectory may be altered to make observations substantially consistent with the provided map.

Accordingly, in response to a determination that the image capture device 102 will be calibrated, the vehicle position may be determined. Additionally, the image capture device 102 calibration may be initialized by estimating a seed value. A vehicle trajectory estimate may be determined, based on the most recent odometry measurements. The most recent frame from the image capture device 120 may be taken and a determination may be made regarding the correspondence of features in the given frame to features in the site map. Specifically, a determination may be made by comparing an expected observation based on the trajectory of the materials handling vehicle 100, calibration and site map, and matching expected features to observed features from the image. The estimated trajectory may be adjusted to determine the jointly optimal estimate of trajectory and calibration given the site map and the feature observations. The calibration confidence may be computed and output.

To determine when to stop the calibration process, the vehicle computing device 103 computes a statistical measure of calibration confidence in the current calibration estimate. This measure is calculated based on the marginal covariance over the calibration variables given the site map, odometry, and feature observations from the image capture device 102. Over time, as more and more features are provided as observations, the calibration confidence in the calibration estimate rises. This is because each successive feature observation provides an extra constraint on possible calibrations of the image capture device 102. So, with time the estimate of the calibration becomes more and more constrained. The net result of the sum of these constraints is a measure of calibration confidence, which is reported in real-time, at the materials handling vehicle 100. When the calibration confidence reaches a predetermined threshold, or other value, the calibration process can be stopped.

Figure 4:
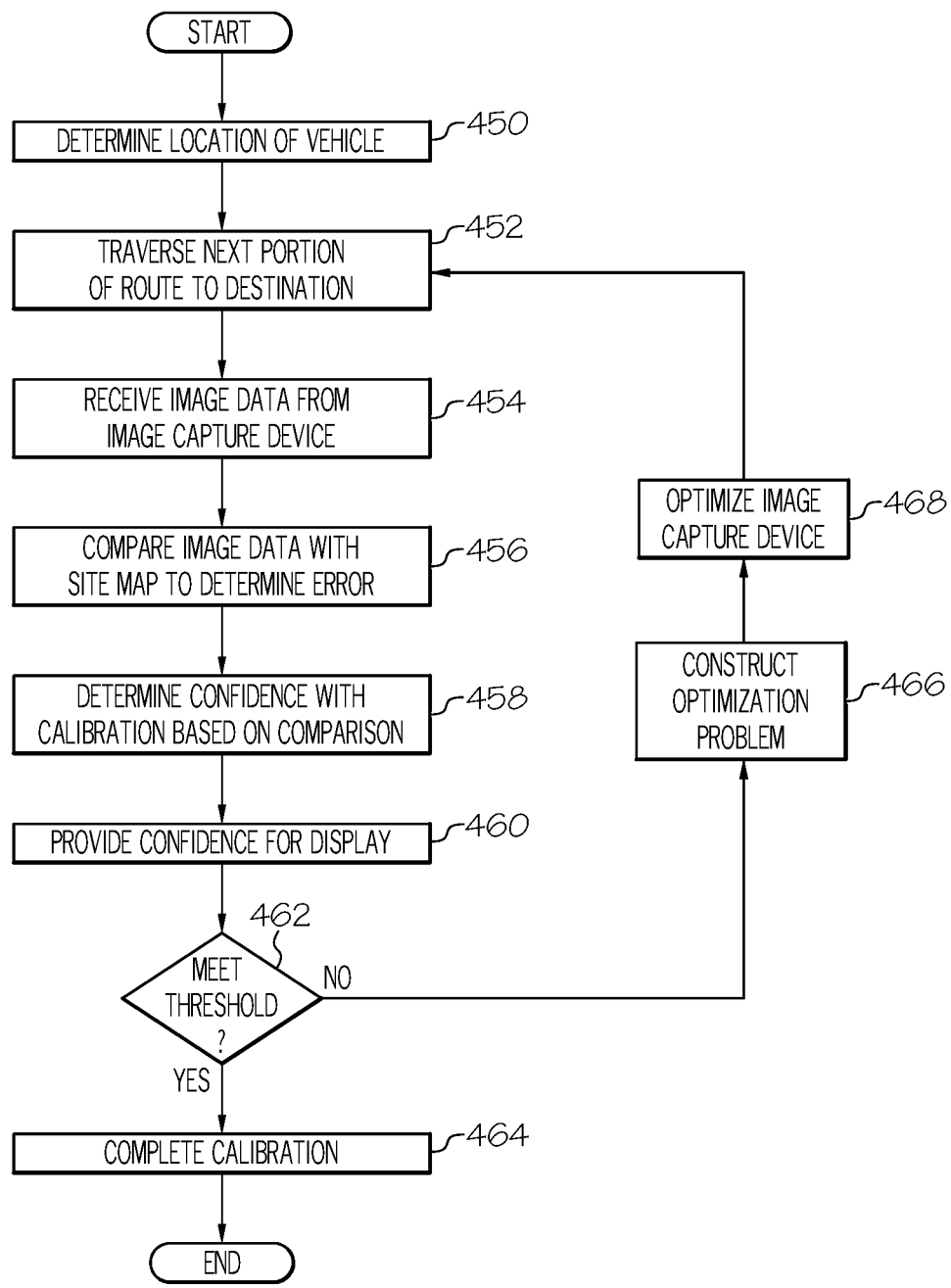
FIG. 4 depicts a flowchart for calibrating an image capture device on a materials handling vehicle.

Accordingly, FIG. 4 depicts a flowchart for calibrating an image capture device 102 on a materials handling vehicle 100. As illustrated in block 450, a location of the materials handling vehicle 100 may be determined. In block 452, the materials handling vehicle 100 may a next incremental portion of the route. In some embodiments, this may include traversing the route to a predetermined destination, while other embodiments may not determine the final destination.

Depending on the particular embodiment, the route may be relatively simple straight line paths, and/or more complex path plans that include a short drive along a guidance wire, followed by a set of 360 degree turns on a spot. In some embodiments, the calibration scheme may also function well with an operator driving freely until the calibration confidence falls below the predetermined threshold. In some embodiments, the driver may provide the materials handling vehicle 100 with suggestions for specific maneuvers to perform based on the current level of calibration uncertainty.

Regardless, in block 454, image data may be received from the image capture device 102. As described above, the image capture device 102 may capture images of the ceiling lights 114, ceiling 112, and/or other light fixture in the environment 110. In block 456, the image data may be compared with a site map to determine error. Specifically, the materials handling vehicle 100 may determine the starting position, the seed value, and may keep track of odometry and other data to determine where the materials handling vehicle 100 travels. With this information, the vehicle computing device 103 may compare an expected image from the site map with an actual image captured by the image capture device 102.

In block 458, a calibration confidence may be determined, based on the comparison. The calibration confidence may be determined via the image capture logic 144a, which may cause the vehicle computing device 103 to compare a pixel (and/or a segment) from the captured image with pixels (and/or segments) from the site map. The calibration confidence may be related to a percentage of segments that match. Additionally, some embodiments may determine an offset of the segments in the captured image from the site map and provide a calibration confidence based on the offset. Other comparisons may also be performed to determine the calibration confidence.

In block 460, the calibration confidence may be provided for display. As an example, the calibration confidence may be provided via a user interface on the materials handling vehicle 100. In block 462, a determination may be made regarding whether the determined calibration confidence meets a threshold. If so, the calibration may be complete. If the calibration confidence does not meet the threshold, an optimization problem may be constructed. Specifically, the optimization problem may be constructed utilizing a library, such as the Georgia Technology smoothing and mapping (GTSAM) library of C++ classes or other smoothing and mapping (SAM) libraries. The GTSAM library implements smoothing and mapping in robotics and vision, using factor graphs and Bayes networks as the underlying computing paradigm rather than sparse matrices.

The SAM library, and other similar libraries, provide a general purpose framework for constructing optimization problems 466 related to satisfying multiple spatial constraints with various associated uncertainties. It is contemplated that portions of the library targeting simultaneous localization and mapping (SLAM) may also be utilized. The SLAM portion of the SAM library specifically provides functionality for optimizing sensor extrinsic calibration using reference frame factors.

Once the optimization problem is expressed in SAM as a factor graph, in block 468, SAM can perform the optimization using any one of a number of general purpose optimizers. For example, the Levenberg-Marquardt is well suited for optimization of embodiments described herein. To determine calibration of the image capture device 102, the stream of sensor measurements may be expressed as discrete SAM factors and these factors are passed to the SAM optimizer to obtain an optimized calibration estimate.

Figure 5:
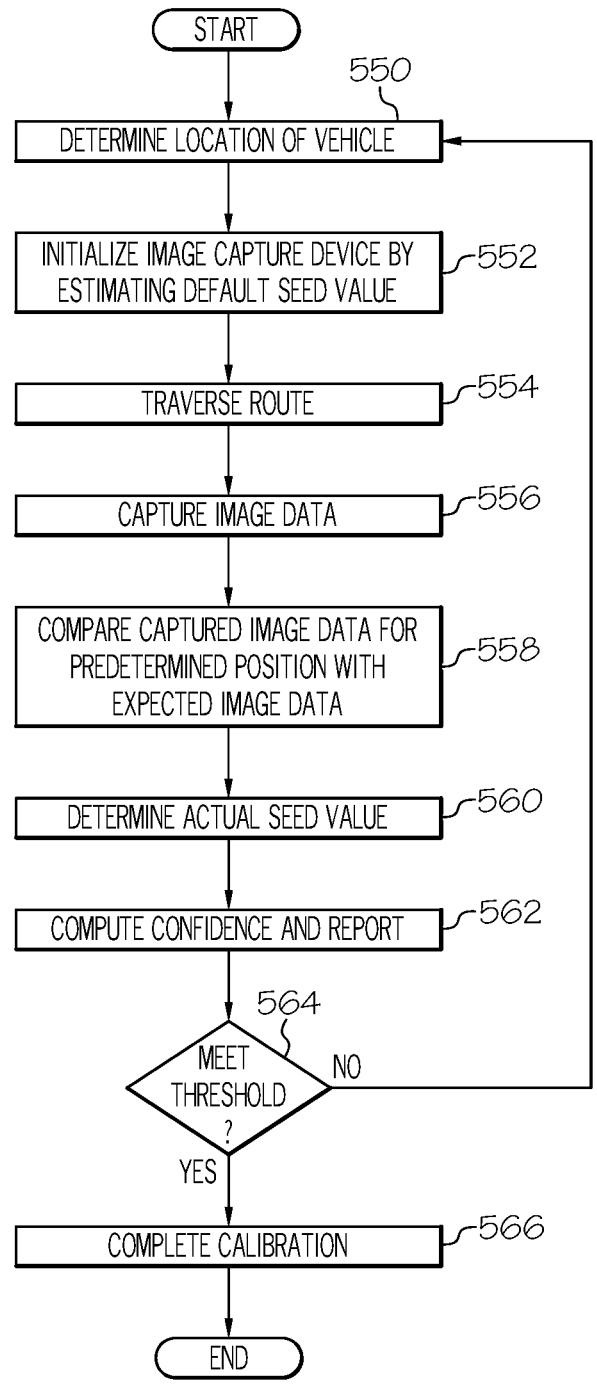
FIG. 5 depicts another flowchart for image capture device calibration on a materials handling vehicle.

FIG. 5 depicts another flowchart for calibration of the image capture device 102 on a materials handling vehicle 100. As illustrated in block 550, a location of the materials handling vehicle 100 may be determined. The location may include a coordinate of the materials handling vehicle 100, as well as a heading of the materials handling vehicle 100. In block 552, calibration of the image capture device 102 may be initialized by estimating a seed value. The seed value may represent a pitch, roll, yaw, zoom, and/or other data related to the image capture device 102 and may be estimated from data provided by the manufacturer of the image capture device 102, from an initial user guess, from an estimate of the position of the image capture device 102, etc. In block 554, the materials handling vehicle 100 may traverse the route. Depending on the embodiment, the route may be a predetermined route that is wire guided, autonomously guided, and/or user guided. Similarly, some embodiments may include a user simply navigating the materials handling vehicle 100 without a predetermined destination or route.

Regardless, in block 556, while the materials handling vehicle 100 is traversing the route, the image capture device 102 may capture at least one image of the ceiling 112. In some embodiments, the vehicle computing device 103 may additionally receive odometry data and the seed value for estimating an approximate location of the materials handling vehicle 100 at one or more points on the route. In block 558, the captured image data may be compared with expected image data from the site map, based on the expected position of the materials handling vehicle 100 along the route. In block 560, the vehicle computing device 103 may determine a calibrated value via the comparison of the image data with the site map, the seed value, and the estimated odometry data. The calibrated value may be utilized for determining a new location of the materials handling vehicle 100.

Figure 6:
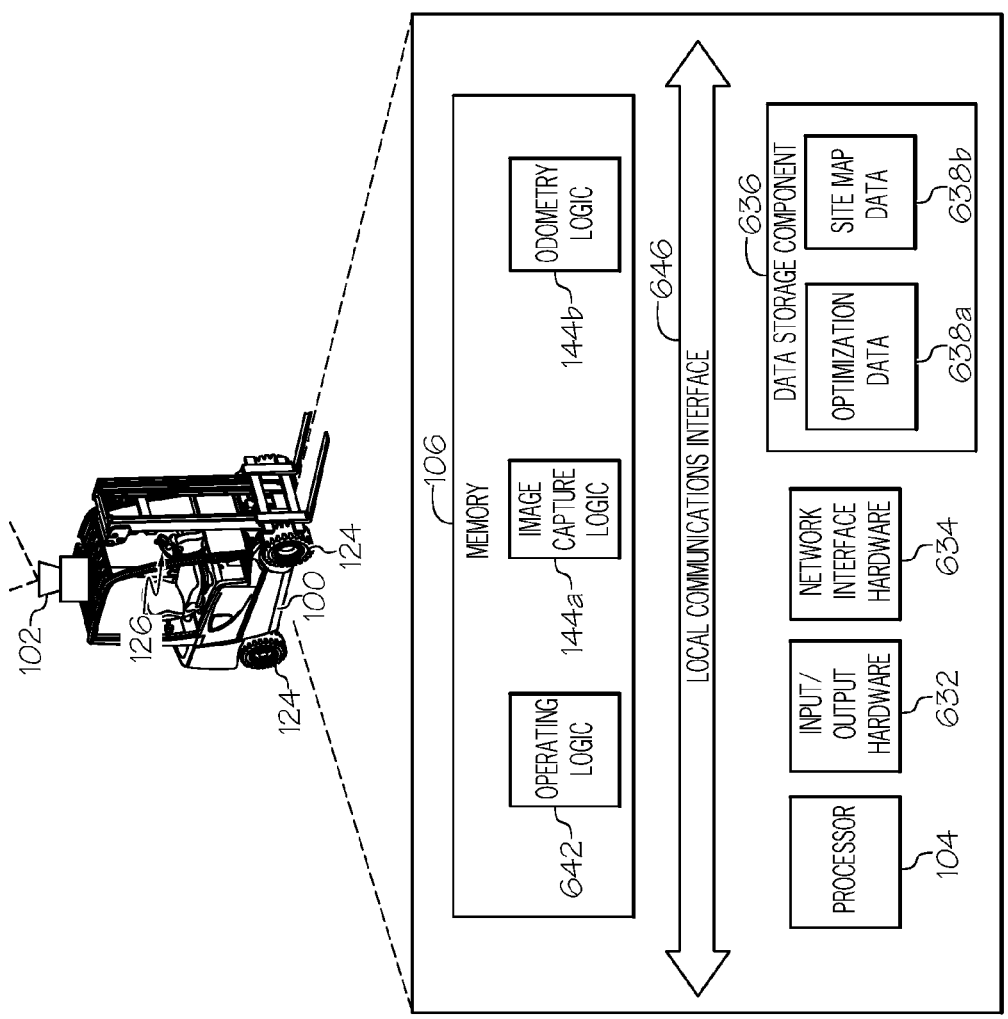
FIG. 6 depicts computing infrastructure that may be utilized for a materials handling vehicle, according to embodiments described herein.

In block 562, the calibration confidence of the calibrated value may be determined. In block 564, a determination may be made regarding whether the calibration confidence meets a predetermined threshold. If so, in block 566, the calibration is complete. If in block 564, the threshold is not met, the process may return to block 550 to restart calibration FIG. 6 depicts computing infrastructure that may be utilized for a materials handling vehicle 100, according to embodiments described herein. As illustrated, the vehicle computing device 103 includes a processor 104, input/output hardware 632, network interface hardware 634, a data storage component 636 (which may store optimization data 638a, site map data 638b, and/or other data), and the memory component 106. The memory component 106 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 103 and/or external to the vehicle computing device 103.

The memory component 106 may store operating system logic 642, the image capture logic 144a and the odometry logic 144b. The image capture logic 144c and the odometry logic 144d may each include a plurality of different pieces of logic, each of which may be embodied as a computer program, firmware, and/or hardware, as an example. A local communications interface 646 is also included in FIG. 6 and may be implemented as a bus or other communication interface to facilitate communication among the components of the vehicle computing device 103.

The processor 104 may include any processing component operable to receive and execute instructions (such as from a data storage component 636 and/or the memory component 106b). As described above, the input/output hardware 632 may include and/or be configured to interface with the components of FIG. 1 including the image capture device 102, the odometer, etc. The network interface hardware 634 may include and/or be configured for communicating with any wired or wireless networking hardware, including an antenna, a modem, a LAN port, wireless fidelity (Wi-Fi) card, WiMax card, Bluetooth™ module, mobile communications hardware, and/or other hardware for communicating with other networks and/or devices. From this connection, communication may be facilitated between the vehicle computing device 103 and other computing devices (such as the remote computing device).

The operating system logic 642 may include an operating system and/or other software for managing components of the vehicle computing device 103. As discussed above, the image capture logic 144a may reside in the memory component 106 and may be configured to cause the processor 104 to operate and/or calibrate the image capture device 102 as described herein. Similarly, the odometry logic 144d may be utilized to utilize and calibrate the odometry data, as described herein.

It should be understood that while the components in FIG. 6 are illustrated as residing within the vehicle computing device 103, this is merely an example. In some embodiments, one or more of the components may reside external to the vehicle computing device 103. It should also be understood that, while the vehicle computing device 103 is illustrated as a single device, this is also merely an example. In some embodiments, the image capture logic 144a and the odometry logic 144b may reside on different computing devices. As an example, one or more of the functionalities and/or components described herein may be provided by remote computing device and/or other devices, which may be communicatively coupled to the vehicle computing device 103. These computing devices may also include hardware and/or software (such as that depicted in FIG. 6) for performing the functionality described herein.

Additionally, while the vehicle computing device 103 is illustrated with the image capture logic 144a and the odometry logic 144b as separate logical components, this is also an example. In some embodiments, a single piece of logic may cause the vehicle computing device 103 to provide the described functionality.

The image capture device calibration techniques of the present disclosure are well-suited for at customer sites, in specialized or generic warehouse configurations. Using optimization and statistical techniques, the image capture device calibration is estimated online, as the materials handling vehicle 100 is driven through the site. The calibration confidence in this estimate is also calculated and provided to the commissioning engineer as real-time feedback on the progress of the calibration, allowing them to know when to conclude the calibration process.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for calibrating a materials handling vehicle are described. It should also be understood that these embodiments are merely exemplary and are not intended to limit the scope of this disclosure.

What is claimed is:

1. A materials handling vehicle comprising materials handling hardware, a wheel, an odometer, a positioning system, and a vehicle computing device, wherein the vehicle computing device stores logic that when executed by a processor, causes the materials handling vehicle to perform at least the following:
   determine a current location of the materials handling vehicle within a warehouse;
   determine, via the odometer, an odometry distance from the current location to a destination based on a calculation of a determined number of rotations of the wheel and a circumference of the wheel;
   determine, via the positioning system, a positioning system distance from the current location of the materials handling vehicle to the destination;
   compare the odometry distance with the positioning system distance to calculate a scaling factor;
   apply the scaling factor to a slow alpha filter to achieve a slow filter result, the slow alpha filter representing a slow change to the odometry distance, based on wear of the wheel;
   apply the scaling factor to a fast alpha filter to achieve a fast filter result, the fast alpha filter representing a fast change to the odometry distance, based on changing of the wheel;
   compare the slow filter result with the fast filter result;
   in response to determining that a difference between the slow filter result and the fast filter result is within a predetermined tolerance, apply the slow filter result to the scaling factor to smooth noise;
   in response to determining that a difference between the slow filter result and the fast filter result is not within the predetermined tolerance, apply the fast filter result to the scaling factor to smooth noise;
   calculate an updated odometry distance utilizing the scaling factor; and
   utilize the updated odometry distance to operate the positioning system.

2. The materials handling vehicle of claim 1, wherein the slow alpha filter includes calculating the following: $FV_1=FV_0(\alpha)+MV(1-\alpha)$, wherein $FV_1$ is a new filter value, $FV_0$ is a prior filter value, MV is a measured value, and $\alpha$ is an alpha value of the slow alpha filter, and wherein the alpha value is equal to about 0.99.

3. The materials handling vehicle of claim 1, wherein the fast alpha filter includes calculating the following: $FV_1=FV_0(\alpha)+MV(1-\alpha)$, wherein $FV_1$ is a new filter value, $FV_0$ is a prior filter value, MV is a measured value, and $\alpha$ is an alpha value of the fast alpha filter, and wherein the alpha value is equal to about 0.9.

4. The materials handling vehicle of claim 1, wherein the predetermined tolerance is equal to about 0.075.

5. The materials handling vehicle of claim 1, wherein the logic further causes the materials handling vehicle to apply a hysteresis value to switch from the fast alpha filter to the slow alpha filter, wherein in response to determining that a difference between the slow filter result and the fast filter result is less than the hysteresis value, the logic causes the materials handling vehicle to switch from the fast alpha filter to the slow alpha filter.

6. The materials handling vehicle of claim 5, wherein the hysteresis value is about 0.0025.

7. The materials handling vehicle of claim 5, wherein the predetermined tolerance and the hysteresis value are determined by logging a raw scaling factor measurement on the materials handling vehicle.

8. The materials handling vehicle of claim 1, wherein the logic further causes the materials handling vehicle to determine whether a change in the scaling factor is a result of at least one of the following: wheel wear and wheel change.

9. The materials handling vehicle of claim 1, wherein the current location of the materials handling vehicle is received from at least one of the following: a user input and triggering of a sensor.

10. The materials handling vehicle of claim 1, further comprising an image capture device that is coupled to the vehicle computing device, wherein the image capture device captures images for identifying the positioning system distance.

11. The materials handling vehicle of claim 1, wherein the logic causes the materials handling vehicle to traverse a predetermined route to reach the destination.

12. The materials handling vehicle of claim 1, wherein calculating the scaling factor comprises dividing the positioning system distance by the odometry distance.

13. The materials handling vehicle of claim 1, wherein logic causes the materials handling vehicle to define a travel distance of that is dependent on a difference between the odometry distance and the positioning system distance.

14. The materials handling vehicle of claim 1, wherein a remote computing device sends data related to a vehicle position to the vehicle computing device.

15. A materials handling vehicle comprising a wheel and a vehicle computing device, wherein:
the vehicle computing device stores logic that when executed by a processor, causes the materials handling vehicle to perform at least the following:
determine a current location of the materials handling vehicle within a warehouse;
determine an odometry distance from the current location to a destination based on a calculation of a determined number of rotations of the wheel and a circumference of the wheel;
determine a positioning system distance from the current location to the destination;
compare the odometry distance with the positioning system distance to calculate a scaling factor;
apply the scaling factor to a slow alpha filter to achieve a slow filter result;
apply the scaling factor to a fast alpha filter to achieve a fast filter result;
in response to determining that the slow filter result is within a predetermined tolerance of the fast filter result, apply the slow alpha filter to the scaling factor to smooth noise;
calculate an updated odometry distance utilizing the scaling factor; and
utilize the updated odometry distance to operate a positioning system.

16. The materials handling vehicle of claim 15, wherein calculating the scaling factor comprises dividing the positioning system distance by the odometry distance.

17. The materials handling vehicle of claim 15, wherein, in response to determining that the slow filter result is not within the predetermined tolerance of the fast filter result, the logic further causes the materials handling vehicle to apply the fast alpha filter to the scaling factor to smooth noise.

18. A method for calibrating odometry of a materials handling vehicle comprising:
determining a current location of the materials handling vehicle within a warehouse;
determining an odometry distance from the current location to a destination based on a calculation of a determined number of rotations of a wheel and a circumference of the wheel;
determining a positioning system distance from the current location to the destination;
comparing the odometry distance with data from the positioning system distance to calculate a scaling factor, wherein calculating the scaling factor comprises dividing the positioning system distance by the odometry distance;
applying the scaling factor to a fast alpha filter to achieve a fast filter result;
applying the scaling factor to a slow alpha filter to achieve a slow filter result;
in response to determining that the slow filter result is not within a predetermined tolerance of the fast filter result, applying the fast alpha filter to the scaling factor to smooth noise;
calculating an updated odometry distance utilizing the scaling factor; and
utilizing the updated odometry distance to operate a positioning system.

19. The method of claim 18, further comprising, in response to determining that the slow filter result is within the predetermined tolerance of the fast filter result, apply the slow alpha filter to the scaling factor to smooth noise.

20. The method of claim 18, wherein applying the scaling factor to the slow alpha filter includes calculating the following: $FV_1 = FV_0(\alpha) + MV(1-\alpha)$, wherein $FV_1$ is a new filter value, $FV_0$ is a prior filter value, MV is a measured value, and $\alpha$ is an alpha value of the slow alpha filter, wherein the alpha value is equal to about 0.99, and wherein applying the scaling factor to the fast alpha filter includes calculating the following: $FV_1 = FV_0(\alpha) + MV(1-\alpha)$, wherein $FV_1$ is a new filter value, $FV_0$ is a prior filter value, MV is the measured value, and $\alpha$ is the alpha value of the fast alpha filter, and wherein the alpha value is equal to about 0.9.

* * * * *